United States Patent
Allan et al.

(10) Patent No.: US 8,396,738 B1
(45) Date of Patent: Mar. 12, 2013

(54) SYSTEM AND METHOD FOR EVALUATING THIRD PARTY MARKETING SERVICES

(75) Inventors: Blair Robert Allan, Camarillo, CA (US); Olivian Pitis, Los Angeles, CA (US); Linda Susan Yee, Sherman Oaks, CA (US); Jessica Renee Bass, Washington, DC (US); Christopher Garth Weinstock, Thousand Oaks, CA (US)

(73) Assignee: Bank of America Corporation, Charlotte, NC (US)

( * ) Notice: Subject to any disclaimer, the term of this patent is extended or adjusted under 35 U.S.C. 154(b) by 1404 days.

(21) Appl. No.: 12/071,575

(22) Filed: Feb. 22, 2008

(51) Int. Cl.
G06Q 10/00 (2012.01)
G06Q 40/00 (2012.01)
G06F 17/00 (2006.01)
G06G 7/00 (2006.01)

(52) U.S. Cl. ............ 705/7.35; 705/7.29; 705/7.34; 705/35; 705/400

(58) Field of Classification Search .......... 705/7.29, 705/7.34, 7.35, 400
See application file for complete search history.

(56) References Cited

U.S. PATENT DOCUMENTS

| | | | | |
|---|---|---|---|---|
| 7,962,363 B2* | 6/2011 | Patel et al. | | 705/14.4 |
| 2002/0072971 A1* | 6/2002 | DeBusk et al. | | 705/14 |
| 2002/0143616 A1* | 10/2002 | Hajdukiewicz et al. | | 705/14 |
| 2003/0110066 A1* | 6/2003 | Walser et al. | | 705/7 |
| 2006/0143285 A1* | 6/2006 | St-Denis | | 709/217 |
| 2007/0294192 A1* | 12/2007 | Tellefsen | | 705/400 |
| 2008/0313014 A1* | 12/2008 | Fell et al. | | 705/10 |
| 2011/0295699 A1* | 12/2011 | Flinn et al. | | 705/14.69 |

OTHER PUBLICATIONS

Cowell, Donna Mack. Mortgage lending outsourcing: no longer a "do it yourself" business. Jan. 2005. ABA Banking Journal, v 97, n 1, p. 67.*

* cited by examiner

*Primary Examiner* — Scott Zare
(74) *Attorney, Agent, or Firm* — Michael A. Spring; Stan Torgovitsky; Roylance, Abrams, Berdo & Goodman, LLP

(57) ABSTRACT

A method and a system for evaluating, determining and customizing third party marketing services, where a listing of reasonable values for a given criteria is generated and referenced when determining the consideration to be paid for the service related to the criteria. The given criteria may include a geographic area, so that the listing of reasonable values is for a number of geographic areas, and the consideration is determined for services to be provided in any one or combination of the geographic areas. Listing of reasonable values may include a listing of baseline fair market value (FMV) basis points that may be applied in determining the fair market value of marketing services provided. The marketing service provided may be based on a custom marketing plan prepared for a specific partner for a specific geographic area with reference to specific marketing media.

23 Claims, 10 Drawing Sheets

SYSTEM AND METHOD FOR EVALUATING THIRD PARTY MARKETING SERVICES

TECHNICAL FIELD

The present invention is in the field of service agreements. In particular, the present invention provides systems and methods for determining appropriate consideration for obtaining services, such as marketing services from third parties, taking into account, for example, costs associated with the services, and/or anticipated benefits of the services.

BACKGROUND OF THE INVENTION

The present invention is not limited to, but typically finds application in, the mortgage lending industry in which lenders may wish to enter into alliance with real estate brokers or builders ("business partners") in order that the business partner shall promote services offered by the lenders to the business partners' customers. This relationship typically results in a marketing services agreement (MSA) that outlines the responsibility of both the lender and the business partner.

For example, a lender enters into an MSA with a business partner for the purpose of having the business partner promote such lender's mortgage lending services to prospective home buyers. Pursuant to an MSA, the business partner performs marketing activities on behalf of the lender that include, inter alia, displaying signage, posters, and other marketing collateral, conducting print, email, or direct mail marketing campaigns, web-based advertising, and so on. The business partner represents and promotes the lender as the preferred lender to facilitate selection of the lender's services by the business partner's prospective customers in particular, and by consumers in general.

In exchange for marketing campaigns and activities performed by the business partner, the lender typically contracts and pays the business partner a marketing fee. The amount of the marketing fee paid by the lender to the business partner must be a fair market value (FMV) payment for bona fide services actually performed by such business partner. The lender can also make direct use of mass media marketing channels at its disposal in order to create demand for its services, for example print advertising, TV, or radio. To facilitate cross-comparisons, the dollar cost of the marketing services contracted either through business partners' marketing activities or through mass media channels can be expressed in terms of basis points (BPS) of the amount of the loans originated or closed as a result of these marketing services being performed for the lender. (A basis point is $\frac{1}{100}$ of 1% so that, for example, 1.47%=147 basis points or 0.50%=50 basis points).

Accordingly, it is highly desirable for a lender to follow a routine approach for establishing competitive and reasonable marketing fees.

SUMMARY OF THE INVENTION

The present invention provides a method and an apparatus to address at least the industry-felt need noted above, and achieve the following exemplary advantages.

According to an exemplary embodiment of the present invention, a method and a system are provided for determining consideration to be paid to a service provider for services rendered, where a listing of reasonable values for a given criteria is provided and referenced when determining the consideration for the service as related to the criteria.

In another exemplary embodiment of the present invention, the given criteria may include a geographic area, so that the listing of reasonable values is for a number of geographic areas, and the consideration is determined for services to be provided in any one or combination of the geographic areas.

In yet another exemplary embodiment of the present invention, the listing of reasonable values includes costs of general media campaigns in particular markets.

In yet another exemplary embodiment of the present invention, the listing of reasonable values may be determined by evaluating the service provider. The evaluation may include but not be limited to, for example, types of marketing services to be provided by the service provider, as well as organizational, cultural and/or financial information about the service provider.

In yet another exemplary embodiment of the present invention, the listing comprises a table containing FMV BPS which may be organized by, e.g., geographical areas reflected by, for example, a ZIP code, with each ZIP code being associated with a FMV BPS.

In an exemplary implementation, the table may further comprise a listing of the maximum FMV BPS for each geographical area, for example maximum FMV BPS per ZIP code.

In yet another exemplary implementation, an adjusted value, rather than a maximum, may be provided for a given criteria. For example, the adjusted value may be set as a percentage below a certain (for example, maximum) FMV BPS per criteria (for example, geographical area based on a ZIP code).

According to another exemplary embodiment of the present invention, a system and method are provided for determining a fair market value and reasonable consideration to be paid to a service provider for services to be rendered, where the determination is based on evaluation of the service provider's ability to provide the service, and includes development of an agreement for providing the service based on the evaluation.

In an exemplary implementation of the embodiments of the present invention where the service to be provided includes marketing, the agreement includes a marketing agreement, and the evaluation includes, but is not limited to, for example, evaluation of the types of marketing services to be provided by the service provider, production data, as well as organizational, cultural and/or financial information about the service provider.

In an exemplary implementation of certain embodiments of the present invention, the evaluation of the marketing services may include, but is not limited to evaluation of information indicative of the current or existing use of media channels by the service provider, such as local and/or regional print/television and/or radio and so on by the service provider.

In another exemplary implementation of certain embodiments of the present invention, the evaluation of the service provider and/or gathering of information concerning the service provider may include, but is not limited to questionnaires completed by the service provider, historical and/or forecasted information obtained independently and/or provided by the service provider, on-site inspection of the service provider facility, and so on.

As will be understood by skilled artisans, while certain methods and systems are described in the context of specific methodologies, data structures and information-gathering and evaluation techniques, systems and methods according to exemplary embodiments of the present invention can also have a general-purpose, function, and application that facilitates determining consideration to be paid to a service provider for services rendered, while maintaining or providing a competitive advantage.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as detailed method steps and elements are provided to assist in a comprehensive understanding of the embodiments of the invention. Accordingly, those of ordinary skill in the art will recognize that various changes and modifications to the embodiments described herein can be made without departing from the scope and spirit of the invention. Also, descriptions of well-known functions and methodologies are omitted for clarity and conciseness.

Figure 1:
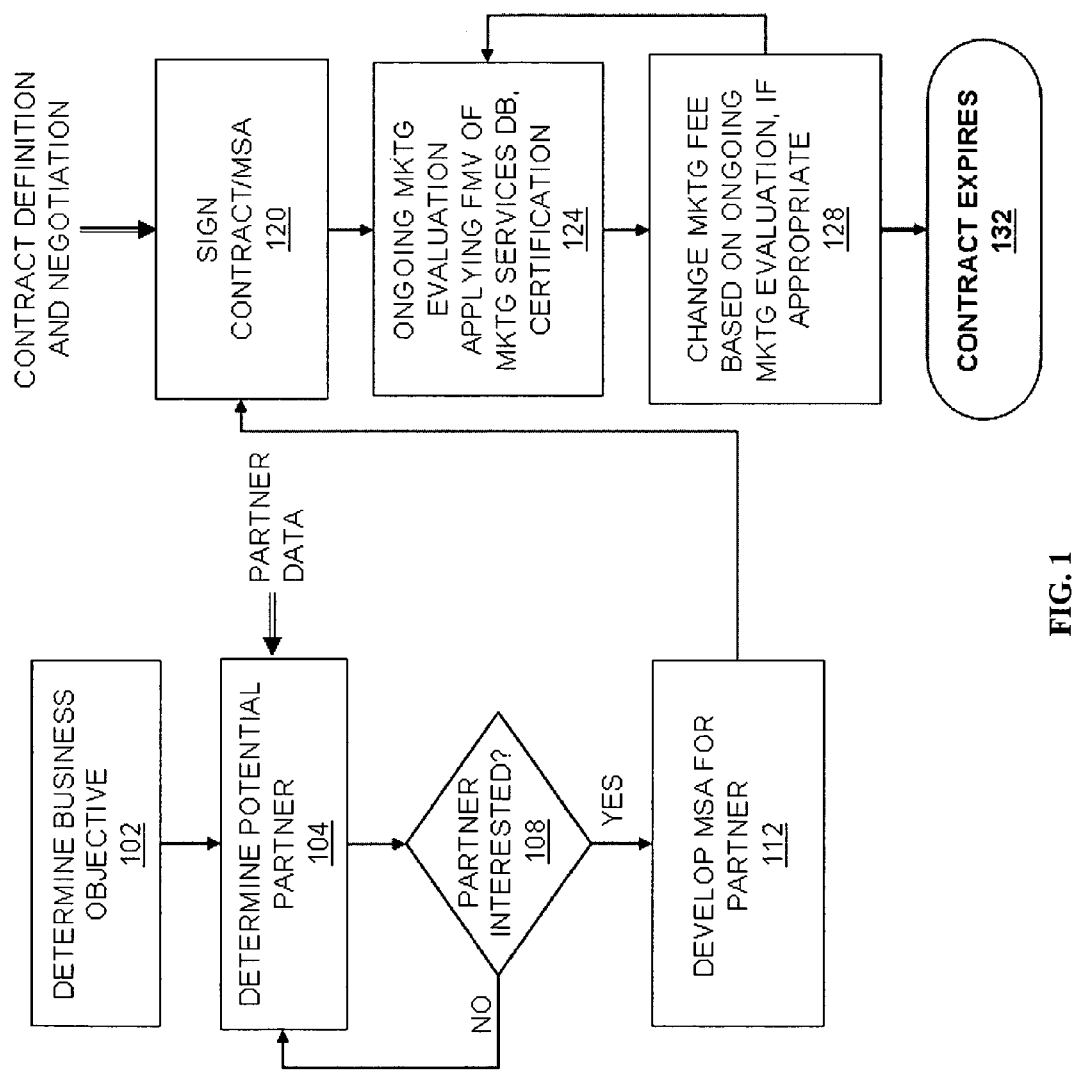
FIG. 1: is a high-level diagram illustrating general process flow in accordance with an exemplary embodiment of the present invention.

Referring to FIG. 1, according to an exemplary embodiment of the present invention, the creation of a marketing agreement between a lender and a prospective real estate broker/builder includes, but is not limited to, the following processes. At the outset, determination of marketing and marketing-related objectives is performed 102, followed by selection/determination of a potential partner 104 and inquiry as to whether the potential partner is interested/available 108 (104 and 108 may be repeated as desired). When it is determined that a potential partner is interested/available, an appropriate MSA which sets forth inter alia the marketing fee to be paid, is developed for the partner 112. After negotiating the terms with the potential partner, a contract such as the MSA is entered into between the lender and the partner 120. Under the terms of the contract, ongoing evaluation 124 and adjustment 128, e.g., a quarterly adjustment, of certain features of the contract/MSA, including inter alia evaluation and prospective adjustment of partner's marketing fees based on, for example, actual partner production data, are performed until the contract expires 132.

According to an exemplary embodiment of the present invention, determining marketing and marketing-related objectives 102 may involve evaluation of the value that a prospective MSA relationship would bring to the lender. Such evaluation may include making certain assumptions in order to calculate the forecasted value of the marketing efforts of the partner—e.g., builder or real estate broker, starting from the partner's projected sales. The assumptions may include, but are not limited to:

Cash Sales Assumption:
provides a way to reflect that a certain percentage of the partner's customers do not need financing for their real estate purchase;

Application Capture Rate:
reflects the percentage of the partner's customers applying for a loan with the lender (which may be based on past or current MSA data or assumptions);

Conversion Rate:
reflects the percentage of loan applications that result in the lender funding the loan;

Loan Capture Rate:
calculated as the product of application capture rate and conversion rate, reflects the percentage of the partner's customers seeking financing or funding and who obtain such funding from lender; and Loan-to-Value (LTV):
used to link the price of the units for sale to actual mortgage production by excluding down payments.

The projected mortgage production likely to result from the marketing services performed by the partner, together with the cost of these marketing services, are used to calculate a cost of marketing services expressed in BPS of mortgage production. This value is further compared to the FMV of marketing services in the geographic area covered by the business partner.

Table 1 reproduced below provides an illustrative, non-limiting example of different evaluation criteria for MSAs (MSA1, MSA2 and MSA3), contemplated in accordance with some of the exemplary implementations of certain embodiments of the present invention.

TABLE 1

|  | MSA1 | MSA2 | MSA3 |
|---|---|---|---|
| Builder | | | |
| Cash sales (minimum) | 0% | 10% | 10% |
| Application capture rate | 70% | 60% | 73% |
| Conversion rate | 75% | 75% | 75% |
| Loan capture rate (maximum) | 53% | 45% | 55% |
| LTV (maximum) | 90% | 85% | 85% |
| Lender originations (% of partner sales) | 47.3% | 34.4% | 42.1% |
| Real estate agent | | | |
| Cash sales (minimum) | 0% | 10% | 10% |
| Application capture rate | 20% | 17% | 20% |
| Conversion rate | 75% | 75% | 75% |
| Loan capture rate (maximum) | 15% | 13% | 15% |
| LTV (maximum) | 90% | 85% | 85% |
| Lender originations (% of partner sales) | 13.5% | 9.8% | 11.5% |

According to an exemplary implementation of the present invention, selection of a potential partner 104 is performed with reference to partner selection criteria which may include, but are not limited to, evaluations of both the prospective partner's business and of the lender's branches that may be fulfilling the MSA relationship with the partner. Non-limiting exemplary implementations of partner-selection criteria for an MSA relationship according to certain exemplary embodiments of the present invention include, inter alia, partner's business type (real estate broker or builder) and geographic reach, projected loan originations, and partner's annual sales.

Figure 2:
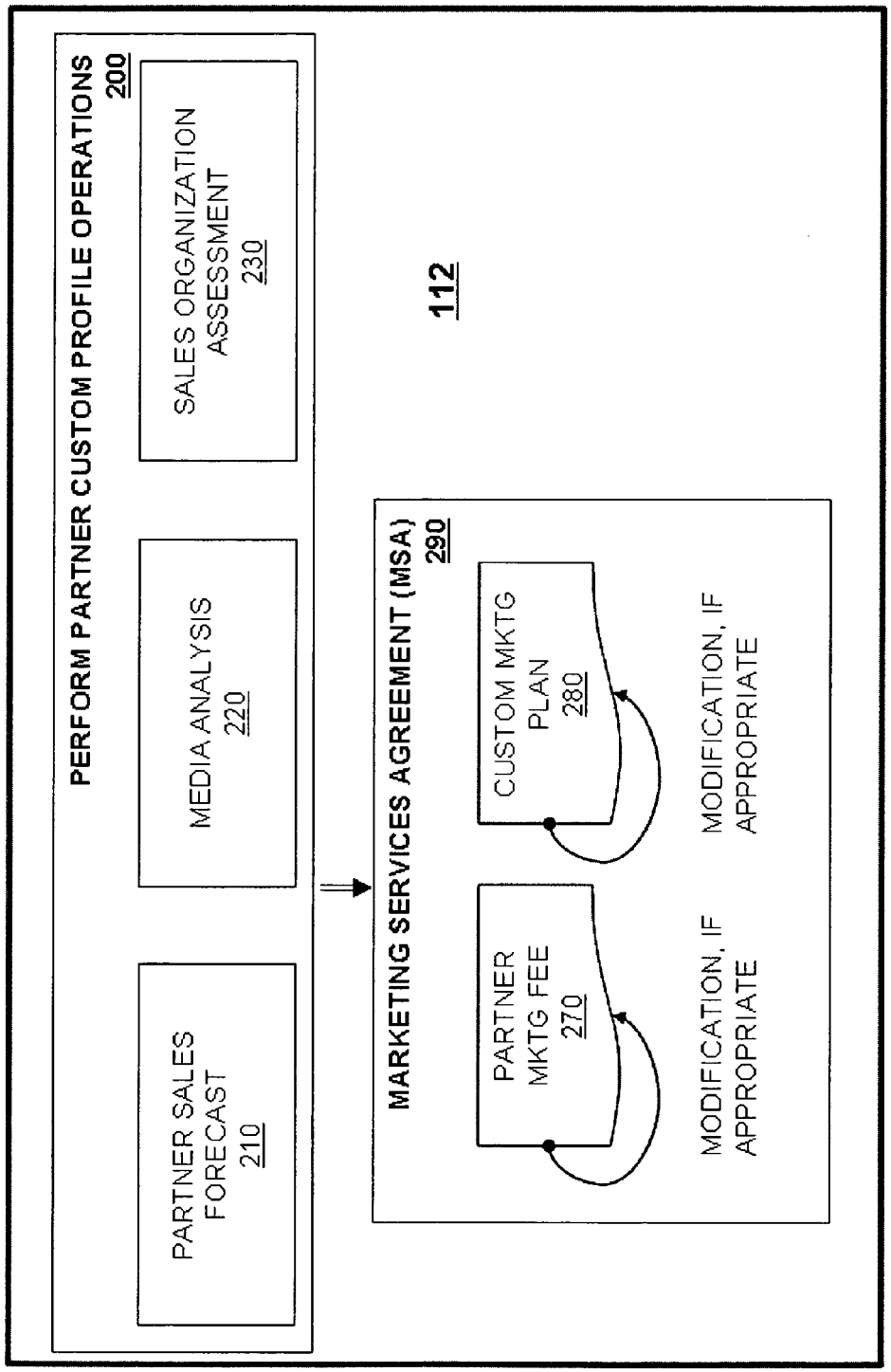
FIG. 2: illustrates an exemplary implementation of operations for developing marketing service agreement according to an exemplary embodiment of the present invention.

Referring to FIG. 2, according to an exemplary embodiment of the present invention, development 112 of an appropriate MSA may include performing custom partner profiling operations 200, such as evaluation of a prospective partner's sales forecast 210, media analysis 220 and assessment of partner's organization 230. Custom partner profiling 200 facilitates the development of an MSA 290 that is tailor made to a particular partner, taking into account determination of a partner's marketing fee 270 and/or development of a partner's custom marketing plan 280. In addition, according to an exemplary implementation of the present invention, the marketing fee 270 and/or custom marketing plan 280 can be modified based on ongoing evaluation, as shown by the circular arrows in FIG. 2.

Figure 3:
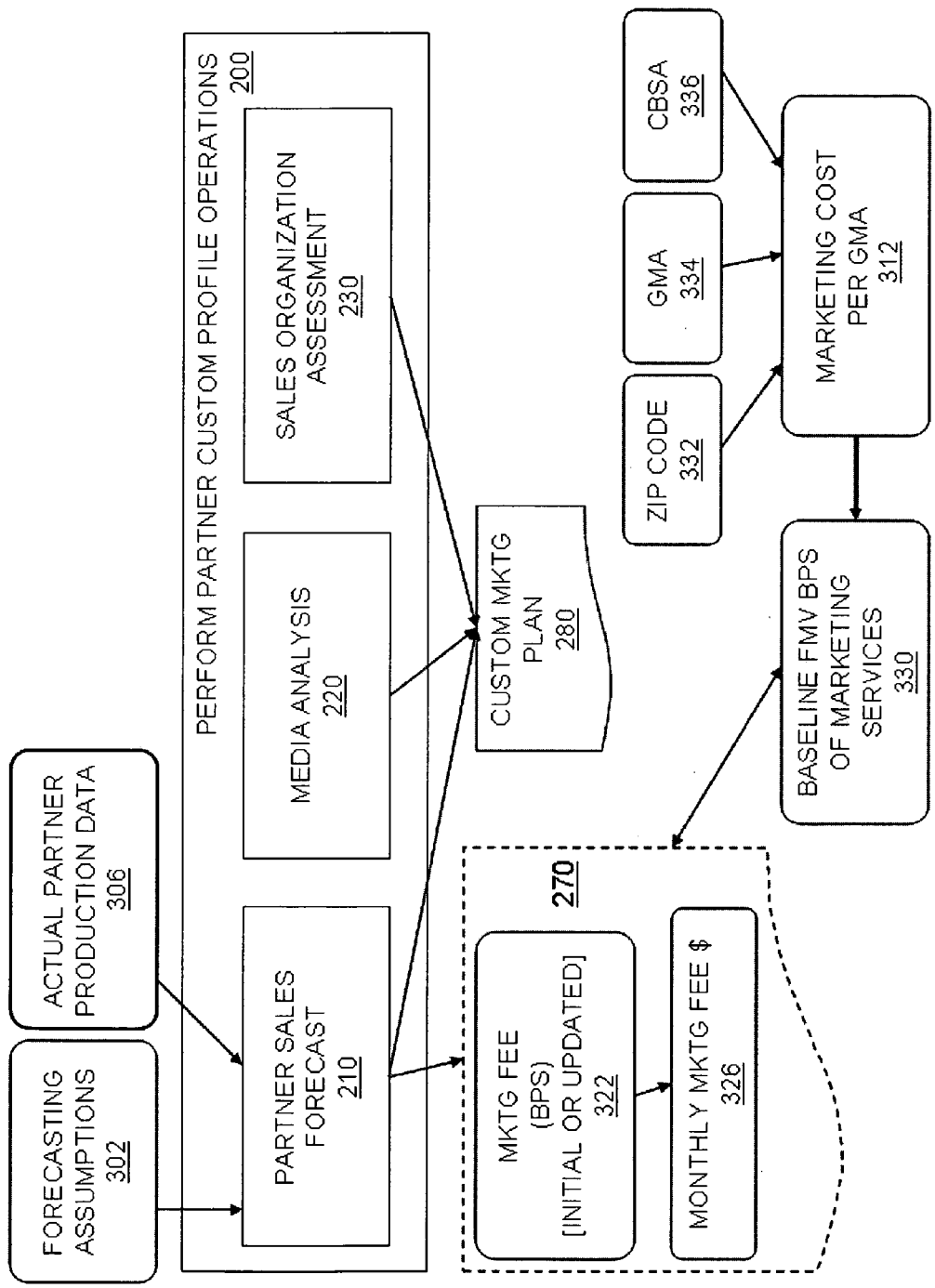
FIG. 3: illustrates in more detail an exemplary implementation of operations for developing a marketing service agreement including a marketing fee and/or a custom marketing plan according to an exemplary embodiment of the present invention.

Referring to FIG. 3, according to an exemplary implementation of certain embodiments of the present invention, determination of a partner sales forecast 210 (FIG. 2) relies in part on forecasting assumptions 302 and actual partner production data 306. For example, during the initial phase of the MSA, forecasting assumptions 302 are used which may include assumptions as noted above with reference to process 102 of FIG. 1. On the other hand, during ongoing evaluation, actual partner production data 306 may be used to make prospective adjustments. An example of the information constituting actual partner production data 306 is illustrated in Table 2 below, where "$ Value" is calculated by multiplying "Units (#)" and "Average Sale Price ($)".

TABLE 2

A) Company Information

Legal entity name (as it appears on W9)
Corporate/umbrella name:
Address:
City:
State:
Phone #:
Fax #:
Website:
List state(s) in which company operates:
Years in business:
Contact name and title:
Contact direct phone #:
Contact e-mail:
Number of real estate agents:
Current/previous preferred lender:

B) Historical Sales Volume (buy-side only)

| Division (office/county/state etc) | Time Period (in months) | YTD Homes Sold & Closed (Escrow Closings, buy-side only) | | | Prior Year Homes Sold & Closed (Escrow Closings, buy-side only) | | |
|---|---|---|---|---|---|---|---|
| | | Units (#) | Avg. sale price ($) | $ Value | Units (#) | Avg. sale price ($) | $ Value |
| | 3 | 64 | $161,511 | $10,336,704 | 290 | $169,129 | $49,047,410 |
| | 3 | 40 | $124,774 | $4,990,960 | 160 | $134,302 | $21,488,320 |
| | 3 | 7 | $100,323 | $702,261 | 27 | $83,021 | $2,241,567 |
| | 3 | 11 | $236,391 | $2,600,301 | 92 | $361,576 | $33,264,992 |
| | 3 | 16 | $291,120 | $4,657,920 | 138 | $231,079 | $31,888,902 |
| | | | | $— | | | $— |
| | | | | $— | | | $— |
| | | | | $— | | | $— |
| | | | | $— | | | $— |
| | | | | $— | | | $— |
| Total | | 138 | $168,755 | $23,288,146 | 707 | $195,094 | $137,931,191 |

C) Forecasted Sales (buy-side only)

Forecasting horizon: 6 mo
From: May 1, 2007
Through: Nov. 1, 2007

| Division (office/county/state etc) | City | State | Homes to be Sold & Closed (Escrow Closings, buy-side only) | | |
|---|---|---|---|---|---|
| | | | Units (#) | Avg. sale price ($) | $ Value |
| 0 | | | 178 | $169,054 | $30,091,612 |
| 0 | | | 101 | $133,682 | $13,501,882 |
| 0 | | | 24 | $85,455 | $2,050,920 |
| 0 | | | 50 | $361,619 | $18,080,950 |
| 0 | | | 75 | $231,276 | $17,345,700 |

TABLE 2-continued

| | | | |
|---|---|---|---|
| 0 | | | $0 |
| 0 | | | $0 |
| 0 | | | $0 |
| 0 | | | $0 |
| 0 | | | $0 |
| | Total | 428 $189,418 | $81,071,064 |

According to an exemplary embodiment of the present invention, determination of a partner's long term sale forecast 210 can facilitate determination of a partner's marketing fee 270, which is shown in the example of FIG. 3, as based on a determination of the fair market value of the marketing cost per loan closed, expressed in BPS 322, that translates into monthly dollar amount 326 paid by the lender to the partner pursuant to the MSA 290 (FIG. 2).

According to an exemplary embodiment of the present invention, as further shown in FIG. 3, determination of a partner's marketing fee 270 is performed with reference to or taking into account a baseline FMV BPS 330. Baseline FMV BPS 330 is determined, inter alia, taking into consideration the fair market value marketing cost in a given market, e.g., a geographic marketing area (GMA) 312 with reference to ZIP code 332, GMA 334 and CBSA 336, as described in detail below.

Figure 4:
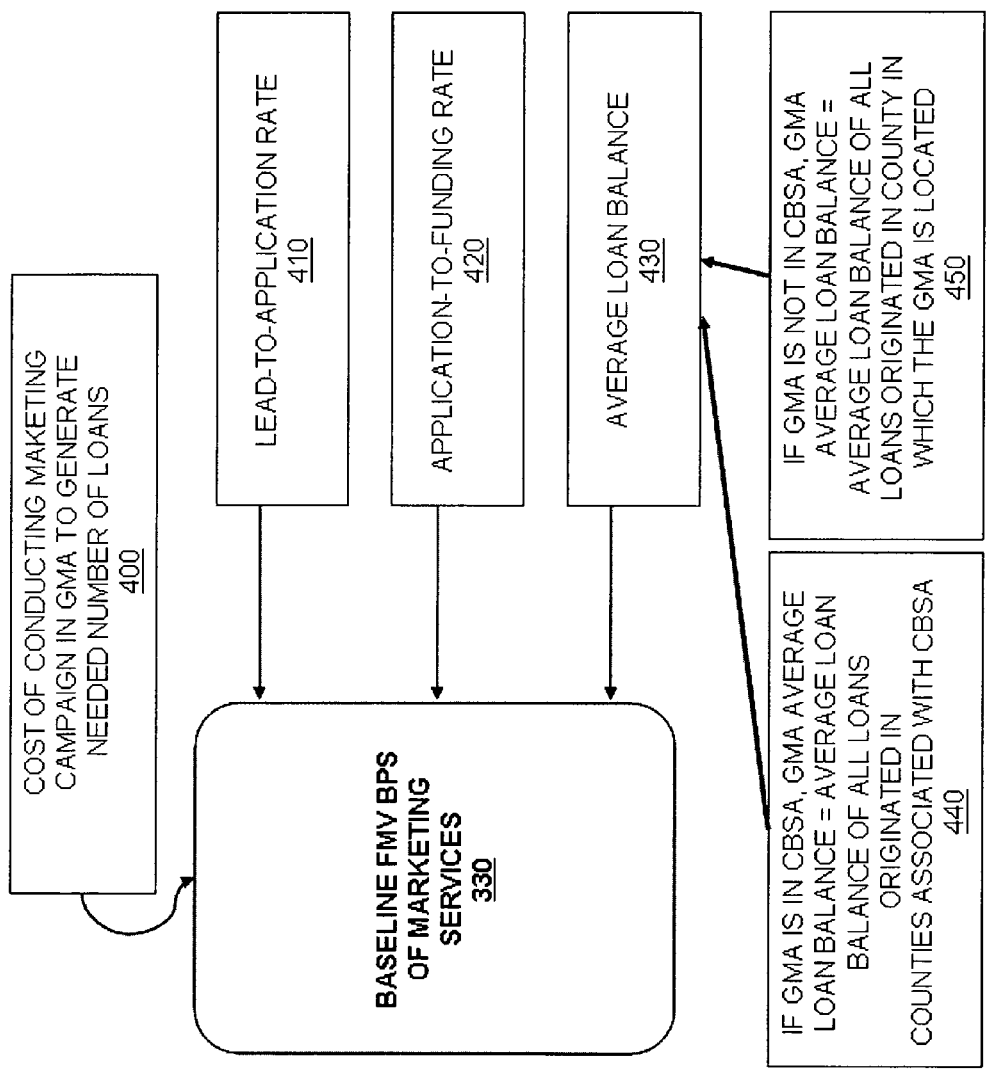
FIG. 4: illustrates exemplary factors for developing a baseline fair market value for marketing services according to an exemplary embodiment of the present invention.

Turning to FIG. 4, an exemplary process for generating baseline FMV BPS 330 may comprise a table or listing for baseline FMV BPS for different geographic areas, for example geographic marketing areas (GMAs). GMA is generally a geographical area defined based on the media vehicles or channels determined or calculated to be employed. For example, the reach of a TV broadcast may have a broader geographical reach as compared to a print media, such as a newspaper. The reach of a publication such as The NY Times may be different from a local newspaper. A GMA according to an exemplary implementation of the present invention is generally defined by a GMA city name and state and may include multiple ZIP codes. FIG. 4 shows an example of a database 330 comprising a table and/or listing of baseline FMV BPS broken down or classified by GMA. Although breakdown by GMA is referenced in FIG. 4, any break down, for example by any locality identification (such as ZIP code, name, geographic coordinates, etc.), is within the scope of exemplary embodiments of the present invention.

According to an exemplary embodiment of the present invention, a database of baseline FMV BPS 330 is generally populated based on the cost 400 that a lender would potentially incur for conducting a marketing campaign in a certain geographical marketing area (GMA) with the purpose of generating a needed or expected (standard) number of loans in that GMA. Information considered in order to populate the database baseline FMV BPS 330 includes, but is not limited to lead-to-application conversion rate 410, application-to-funding rate 420 and average loan balance 430 as described below. The baseline FMV BPS table contains in general the cost of marketing per closed loan expressed in BPS that is a fair market value. In some embodiments, the FMV BPS table may have been derived based on the lender's past or estimated marketing campaign costs, marketing costs by other third parties or based on studies, including marketing costs calculated taking into account the market and the marketing media available in that market.

In an exemplary implementation, FMV of marketing services in a specific GMA, expressed in BPS is computed by means of:

$$\text{FMV BPS} = B/(C \cdot D) \qquad \text{Equation 1:}$$

where (B) is cost in dollars of a marketing campaign that would generate a standard number of loans (C), and (D) is an average loan balance for the GMA.

In an exemplary implementation, the standard number of loans can be determined by taking into consideration average past MSA production data. For example, if prior year MSA production data indicates that a certain number (N) of MSAs resulted in a certain dollar amount of loan production ($P), then for a given average loan balance ($B) this amounts to a certain number of loans per MSA per year (Y). For example, Y=P/(N*$B). One of ordinary skill in the art would readily appreciate that other factors can be considered when determining a standard number of loans per MSA per year. This standard number of loans per MSA per year may then become the targeted loan production for the marketing campaign evaluated for a particular GMA.

The standard number of loans is used in conjunction with lead-to-application conversion rate 410 and application-to-funding rate 420, which is used to link the number of leads needed or expected to the number of loans generated, to establish a number of leads that a desired marketing campaign may generate, by means of:

$$\text{Leads needed} = \frac{\text{Targeted Loan Production}}{(\text{lead-to-application rate}) \cdot (\text{application-to-funding rate})} \qquad \text{Equation 2}$$

where: the targeted loan production corresponds to the standard number of loans, determined as explained above; and lead-to-application conversion rate 410 and application-to-funding rate 420 are assumed percentage values determined by evaluating past marketing campaign, for example as shown in Table 3 below. Other means of determining the number of leads needed may also be performed. In some embodiments, the number of leads needed is the number of leads generally expected to be necessary to result in the number of loans anticipated or the targeted loan production.

TABLE 3

| | Direct-response TV: Jan. 2, 2006 to Jul. 30, 2006 | Radio: Feb. 27, 2006 to Jul. 30, 2006 |
|---|---|---|
| Spots Aired | 4,300 | 1,496 |
| Gross Calls | 184,398 | 1,927 |
| De-Duped Calls | 121,511 | 1,275 |
| Non-Leads | 35,483 | 1,131 |
| Net Leads | 73,307 | 697 |
| Applications | 7,623 | 55 |
| Lead to application rate | 10.4% | 7.9% |

TABLE 3-continued

|  | Direct-response TV:<br>Jan. 2, 2006 to<br>Jul. 30, 2006 | Radio:<br>Feb. 27, 2006 to<br>Jul. 30, 2006 |
|---|---|---|
| Estimated loans funded | 3,844 | 28 |
| Application to funding rate | 50.4% | 50.2% |

Referring to Table 3, in an exemplary implementation, the values adopted for lead-to-application conversion rate 410 and application-to-funding rate may be certain percentage values, e.g. U % and V %, respectively, which are higher than the rate values based on actual experience. According to an exemplary implementation of the present invention, adopting assumption rate values that are higher than rate values based on actual experience may result in a more efficient marketing campaign being modeled in the fair market value analysis, and thus a lower cost value may be used to compare the marketing fee paid under a proposed MSA.

The number of leads needed to generate the targeted loan production is directly related to the cost 400 of conducting a marketing campaign needed to generate the needed number of loans (see FIG. 4). In an exemplary implementation of the present invention, cost 400 can be established with reference to the following non-limiting factors:

a) the media channels available in the GMA;

b) the open market rates for the available media channels;

c) the response rate assumptions for each media type (for example, print vs. broadcast); and d) past experience in building cost-effective media mixes with the purpose of reaching specific sales targets.

where data for factor c) can be provided by the lender based on, for example, the following:

Newspaper campaign response rates for financial products for a range of financial services ranging from credit cards, to insurance, to mortgages.

Actual broadcast campaign response rates (calculated as leads/media impressions) for radio and TV campaigns.

Exemplary calculations and assumptions for broadcast campaign response rates are shown in Table 4 below;

data for factor d) can be based on regional marketing analyses conducted, assuming that the media mix used in the MSA analysis is a reasonable, cost-effective method to generate the required leads based upon the open rate market at the time. It is understood that this analysis may be used as guidance only since actual costs could vary based upon negotiations with media outlets, changes in media selections, and changes in market conditions.

TABLE 4

| | | | Actuals: [Time period] Activity | | | | |
|---|---|---|---|---|---|---|---|
| MediaChannel | # Spots | Avg # Viewers In Daytime | Total Impressions | De-duped Calls | Calls/ impressions | Calculated Net leads | Leads/impressions |
| NATIONAL CABLETV | | | | | | | |
| CABLEChannel1 | 91 | 19,000 | 29,029,000 | 2,056 | 0.0071% | 1,240 | 0.0043% |
| CABLEChannel2 | 29 | 87,000 | 2,523,000 | 172 | 0.0068% | 104 | 0.0041% |
| CABLEChannel3 | 92 | 187,000 | 17,204,000 | 968 | 0.0056% | 584 | 0.0034% |
| CABLEChannel4 | 54 | 261,000 | 14,094,000 | 624 | 0.0044% | 376 | 0.0027% |
| CABLEChannel5 | 268 | 105,000 | 28,140,000 | 1,176 | 0.0042% | 709 | 0.0025% |
| Total National Cable TV | 534 | | 90,990,000 | 4,996 | 0.0055% | 3,014 | 0.0033% |
| SYNDICATED TV | | | | | | | |
| TVShow1 | 18 | 3,656,000 | 65,808,000 | 4,416 | 0.0067% | 2,664 | 0.0040% |
| RADIO | | | | | | | |
| RADIOShow1 | 34 | 250,000 | 8,500,000 | 110 | 0.0013% | 66 | 0.0008% |
| RADIOShow2 | 29 | 400,000 | 11,600,000 | 159 | 0.0014% | 96 | 0.0008% |
| Total Radio | | 650,000 | 20,100,000 | 269 | 0.0013% | 162 | 0.0008% |

According to an exemplary implementation of the present invention, calculation of average loan balance 430 is performed by taking into account the following non-limiting information:

number of loans and average loan balance at origination by county in a certain time period;

list of GMAs defined by, for example, coverage of major media channels (such as local newspaper of large circulation, radio station, local cable TV interchange); and U.S. Census list of ZIP codes by city, county, and Core-based Statistical Area (CBSA) comprising metropolitan and micropolitan statistical areas defined by the US Census Bureau described at, for example, http://www.census.gov/population/www/estimates/aboutmetro.html (which information is incorporated herein by reference in its entirety).

In an exemplary implementation, the following methodology may be adopted to calculate average loan balance 430 for a given GMA:

if the GMA (identified by the city name(s)) is in a CBSA, the GMA is assigned the average loan balance of all the loans originated by the lender in the counties associated with the CBSA (see 440 of FIG. 4); and if the GMA is not in a CBSA, the GMA is assigned the average loan balance of all the loans originated by the lender in the county in which the GMA is located (see 450 of FIG. 4).

An example of FMV analysis for a GMA is shown below in Table 5, where the targeted loan production=200, lead-to-application conversion rate=10% and application-to-funding rate=20%, and the fair market value calculated as a cost of marketing activity expressed as a percentage of loan production is 28 BPS.

TABLE 5

[GMA]

Production requirements

| | |
|---|---|
| Average Loan Balance | $2,000,000 |
| Loans per Year | 200 |
| Mortgage production | $400,000,000 |
| Lead to App Conversion | 10.0% |
| App to Funding Conversion | 20.0% |

Media results needed to meet production requirements

| | |
|---|---|
| Leads | 10,000 |
| Applications | 1,000 |

| Local demographics | [region(s)/city(s)/county(s) name(s)] | [region(s)/city(s)/county(s) name(s)] | Also Applies to: [region(s)/city(s)/county(s) name(s)] |
|---|---|---|---|
| TV Households | 2,355,700 | | |
| Cable Households | | 1,526,740 | |
| A12+ DMA popn | 5,742,100 | 5,829,700 Radio A12+ MSA popn | |
| A25-49 DMA popn | 2,472,000 | | |
| A25-49 Index | 0.43 | | |
| Cable opn Index | 2.4 | | |

Media Mix

| Print | 2006 AVG CPI | #Insertions | Circulation | Impressions | Leads generated | Response rate | Gross Costs | Costs/lead |
|---|---|---|---|---|---|---|---|---|
| News Paper | $3,556 | 52 | 190,613 | 30,000,000 | 3,000 | 0.01% | $184,912 | $62 |
| | | — | — | — | — | 0.01% | $— | $— |
| | | — | — | — | — | 0.01% | $— | $— |
| | | — | — | — | — | 0.01% | $— | $— |
| | | — | — | — | — | 0.01% | $— | $— |
| Total Print | | | 190,613 | 30,000,000 | 3,000 | | $184,912 | $62 |

| Broadcast | 2006 AVG CPP | TRPs | Target audience | Impressions | Leads generated | Response rate | Gross Costs | Costs/lead |
|---|---|---|---|---|---|---|---|---|
| Local Cable | $1,759 | — | 1,602,115 | — | — | 0.006% | $— | $1,830 |
| Spot TV | $1,253 | 0 | 2,472,000 | — | — | 0.006% | $— | $845 |
| Spot Radio | $616 | 1,555 | 2,509,712 | 116,666,666 | 7,000 | 0.006% | $958,059 | $137 |
| Total Broadcast | | | 6,583,827 | 116,666,666 | 7,000 | | $958,059 | $137 |
| Total Media Mix | | | | 146,666,666 | 10,000 | | $1,142,971 | $114 |
| | | | | Leads needed | 0 | | | |

Media Mix Results

| | |
|---|---|
| Total leads generated | 10,000 |
| Applications | 1,000 |
| Loans | 200 |
| Fundings | $400,000,000 |
| Marketing cost/loan | $ 5.715 |
| Marketing cost/$production | 0.28% |

An illustrative example of a listing of FMVs of marketing services by GMA is shown below in Table 6, where in this illustrative example, the number of loans in each GMA is 220 and "% of funding" reflects the FMV BPS.

TABLE 6

| Geographic Marketing Area | Print spend $ | % | Broadcast spend $ | % | Total spend $ | % of funding | Avg loan balance $ | Total fundings $ |
|---|---|---|---|---|---|---|---|---|
| City 1 | 100,000 | 45% | 122,222 | 55% | 222,222 | 0.20% | 505,050 | 111,111,000 |
| City 2 | 200,000 | 40% | 366,666 | 60% | 566,666 | 0.30% | 858,584 | 188,888,667 |
| ... | ... | ... | ... | ... | ... | ... | ... | ... |
| City 3 | 250,000 | 15% | 1,416,667 | 85% | 1,666,667 | 0.25% | 3,030,304 | 666,666,800 |
| City 5 | 300,000 | 20% | 1,200,000 | 80% | 1,500,000 | 0.35% | 1,948,052 | 428,571,429 |
| ... | ... | ... | ... | ... | ... | ... | ... | ... |
| City 6 | 10,000 | 5% | 190,000 | 95% | 200,000 | 0.27% | 336,700 | 74,074,074 |
| City 7 | 20,000 | 10% | 180,000 | 90% | 200,000 | 0.31% | 293,255 | 64,516,129 |
| ... | ... | ... | ... | ... | ... | ... | ... | ... |

According to an exemplary embodiment of the present invention, a ZIP code is matched to a GMA creating a listing of FMV BPS for each ZIP code, so as to facilitate identification of FMV BPS for marketing services for a specific partner (real estate broker/builder) located in a specific ZIP code.

Figure 5:
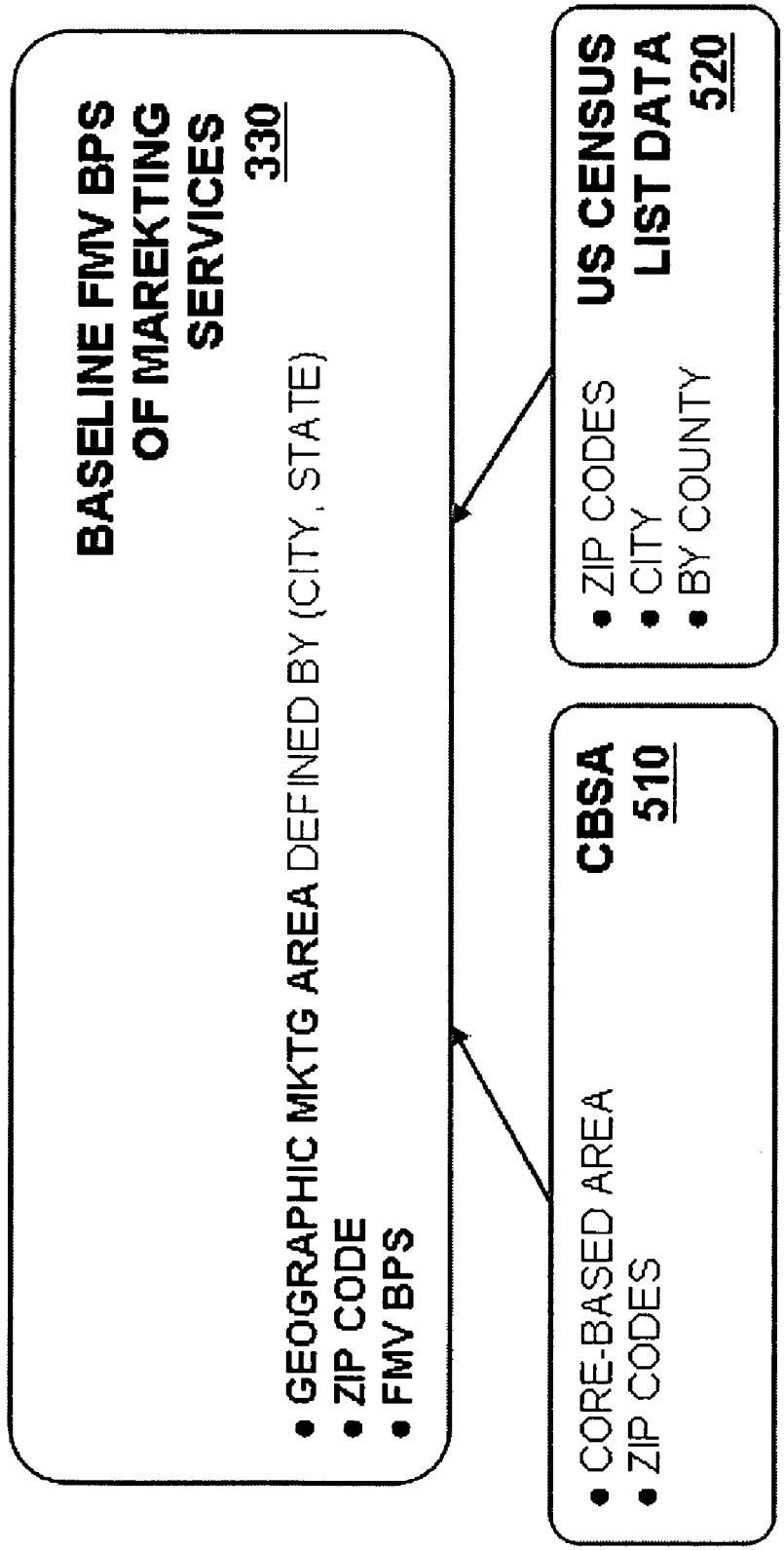
FIG. 5: illustrates exemplary parameters for a baseline fair market value for marketing services according to an exemplary embodiment of the present invention.
Figure 6:
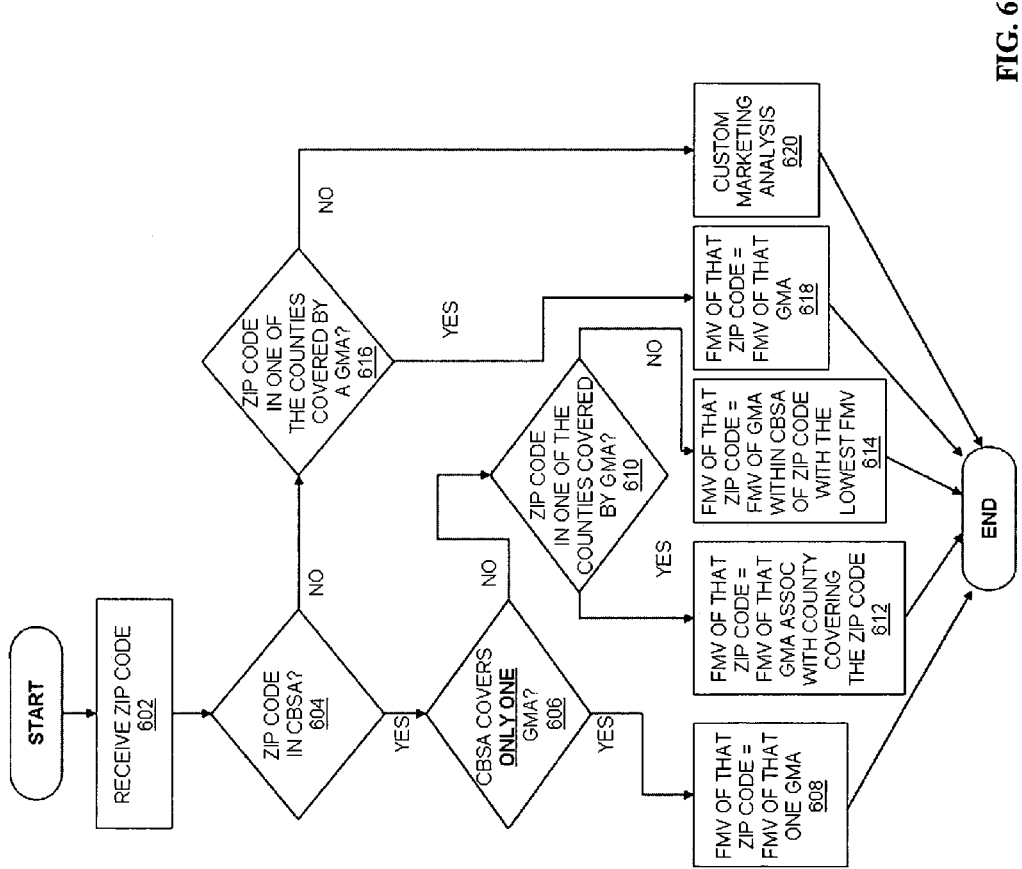
FIG. 6: illustrates exemplary processing for evaluating a baseline fair market value for marketing services with reference to a geographic area according to an exemplary embodiment of the present invention.

Referring to FIG. 5, according to an exemplary embodiment of the present invention, a baseline FMV BPS 330 broken down by ZIP code, as well as GMA is provided. In an exemplary implementation, ZIP codes may be matched to GMAs to create a baseline FMV BPS 330 that includes a listing of FMV BPS for each ZIP code. As illustrated in the flowchart of FIG. 6 a methodology that may be adopted for matching ZIP codes to GMAs starts with receiving of a ZIP code (602) and includes the following non-limiting processes performed with reference to CBSA 510 and U.S. Census list data 520:

- If the ZIP code is located in a CBSA (604—'Yes') and CBSA in which the ZIP code is located contains only one GMA (606—'Yes'), the ZIP code is allocated the FMV of marketing services for the corresponding GMA (S608);
- If the ZIP code is located in a CBSA (604—'Yes') and CBSA in which the ZIP code is located contains more than one GMA (606—'No'), and the ZIP code is located in one of the counties covered by a GMA (610—'Yes'), the ZIP code is allocated the FMV of marketing services of that GMA (612);
- If the ZIP code is located in a CBSA (602—'Yes') and CBSA in which the ZIP code is located contains more than one GMA (606—'No'), but not in a county covered by a GMA (610—'No'), the ZIP code is allocated the FMV of marketing services of the GMA with the lowest cost in that CBSA (614);
- If the ZIP code is not located in a CBSA (604—'No'), but the ZIP code is located in a county covered by a GMA (616—'Yes'), the ZIP code is allocated the FMV of marketing services of that GMA (618); and
- If the ZIP code is not located in a CBSA (604—'No') and the ZIP code is not located in a county covered by a GMA (616—'No'), a custom marketing analysis may be conducted.

According to an exemplary implementation of the present invention, a methodology is proposed that provides a FMV of marketing services for 17,000 ZIP codes in which 196 million people live (75 million households). An illustrative excerpt of a listing of an FMV BPS for a given set of ZIP codes is shown below in Table 7. One of ordinary skill in the art would readily appreciate that this table provides ranges that may aid in making determinations, but by no means mandate that any of the values, such as e.g., the maximum range, must be used.

TABLE 7

| GMA | BPS | ZIP |
|---|---|---|
| City 1, State 1 | 0.17% | 11111 |
| City 1, State 1 | 0.17% | 11112 |
| City 1, State 1 | 0.17% | 11113 |
| City 1, State 1 | 0.17% | 11114 |
| City 1, State 1 | 0.17% | 11115 |
| ... | ... | ... |
| City 2, State 2 | 0.29% | 22221 |
| City 2, State 2 | 0.29% | 22222 |
| City 2, State 2 | 0.29% | 22223 |
| City 2, State 2 | 0 29% | 22224 |
| City 2, State 2 | 0.29% | 22225 |
| ... | ... | ... |
| City 3, State 3 | 0.18% | 33331 |
| City 3, State 3 | 0.18% | 33332 |

TABLE 7-continued

| GMA | BPS | ZIP |
|---|---|---|
| City 3, State 3 | 0.18% | 33333 |
| City 3, State 3 | 0.18% | 33334 |
| City 3, State 3 | 0.18% | 33335 |
| ... | ... | ... |

According to yet another exemplary implementation of the present invention, baseline FMV BPS for a given MSA partner can be easily ascertained based on the ZIP code of the partner's locations originating the loan production. On the other hand, according to an exemplary implementation, if a given MSA partner has locations originating loan production whose ZIP codes are in different GMAs, a weighted average by the forecasted loan production is calculated to be used as a reference FMV BPS for that particular MSA, as illustrated below with reference to Table 8.

TABLE 8

| ZIP code of construction projects | Forecasted production | % of total forecasted production | Geographic Marketing Area | Fair market value of marketing services |
|---|---|---|---|---|
| 11111 | $100,000,000 | 33% | GMA1 | 0.17% |
| 22222 | $200,000,000 | 67% | GMA2 | 0.31% |
| Total | $300,000,000 | 100% | — | 0.28% |

That is, in the example of Table 8, an MSA partner has construction projects in two different ZIP codes, 11111 and 22222, located in two different GMAs, GMA1 and GMA2, respectively. The reference FMV BPS in this example is:

$$(0.33 \cdot 0.17\%) + (0.67 \cdot 0.31\%) = 0.28\%$$

In the example above, the reference FMV BPS was computed based on the percent of total forecasted production in each of the ZIP codes. According to another exemplary implementation, the reference FMV BPS may be computed based on the percent of total leads in each of the ZIP codes. That is, if in the scenario shown in Table 8, 50% of the leads were from ZIP code 11111, and the other 50% were from ZIP code 22222, then the reference FMV BPS computed based on percent of total leads is:

$$(0.50 \cdot 0.17\%) + (0.50 \cdot 0.31\%) = 0.24\%$$

One of ordinary skill in the art would readily appreciate that other factors can be used in determining the weighted average that can be used as a reference FMV BPS.

Figure 7:
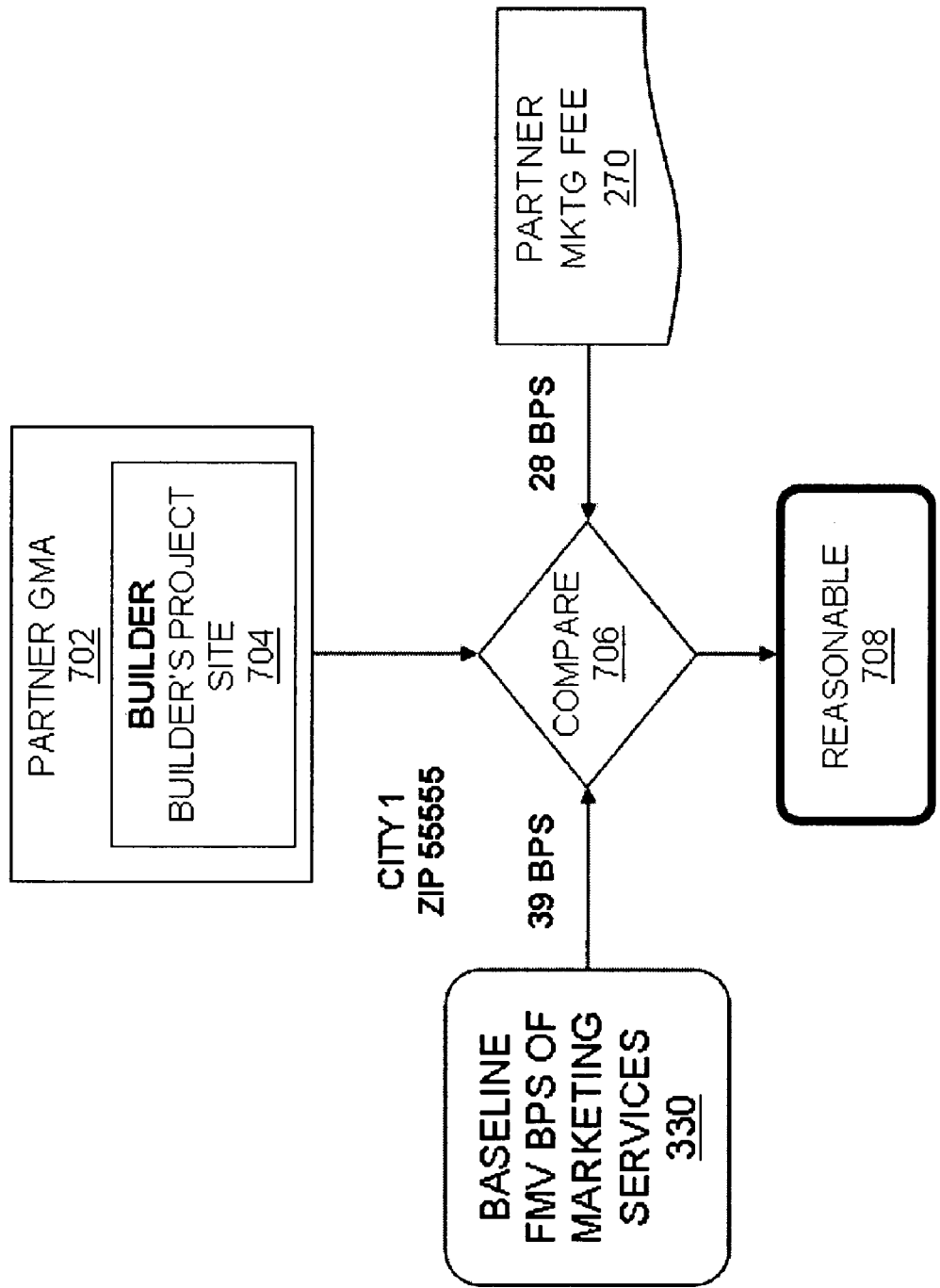
FIG. 7: illustrates exemplary processing for evaluating marketing fee with reference to a baseline fair market value for marketing services according to an exemplary embodiment of the present invention.

According to an exemplary embodiment of the present invention, after an initial or proposed MSA partner marketing fee (BPS) 322 has been developed based on, for example, partner sales forecast 210, as described above with reference to FIGS. 2 and 3, the proposed MSA partner marketing fee (BPS) is compared to the baseline (or reference) FMV BPS 330 developed as described above with reference to FIGS. 3-6. The comparison, for example performed as illustrated in FIG. 7, ensures that the partner marketing fee 270 in partner's GMA 702 (in the case of a builder, the location of the builder's project site 704) is reasonable and is fair market value 708 when compared 706 with the baseline (or reference) FMV BPS of marketing services 330 determined as described above. For example, reasonableness or fair market value determination 708 can be made by determining whether partner marketing fee 270, based on the BPS contracted with the partner is less than the baseline (or reference) FMV BPS 330. The reasonableness determination may also be influenced by internal company guidelines or by industry standards. This reasonableness determination to some extent ensures that the marketing fee paid to the partner is reasonable and is a fair market value that does not exceed the reasonable value of marketing services performed. In some embodiments, an industry standard is applied to set a partner marketing fee 270, and such value 270 is then validated against the baseline FMV BPS 330. Let us assume, for example, that the FMV BPS 330 for ZIP code 55555 as shown in FIG. 7 is 39 FMV BPS. The BPS contracted or selected for the partner, which is also performing the marketing services in that ZIP code, is 28 BPS. In this scenario, the lender can infer that the BPS used in calculating the partner's marketing fee is a fair and reasonable value considering it is less than the FMV BPS in the database, i.e., 28 BPS is less that 39 FMV BPS. Let us further assume that the partner's projected sales value is $60,000,000, and 50% of that value is projected to lead to closed loans for the lender. The flat monthly fee paid to the partner is then calculated as: $60,000,000*50%*28BPS (0.0028)/12 months=$7,000. This flat monthly fee may be adjusted as described above, but at no point are the fee adjustments calculated retroactively, or intended to serve as a compensation mechanism for marketing results during the prior period.

Referring once again to FIGS. 1-3, according to an exemplary embodiment of the present invention, development of an MSA for a partner 112 includes, inter alia, development of a custom marketing plan 280 based on partner sales forecast 210, media analysis 220, and sales organization assessment 230, as well as other custom profile operations 200. Evaluation of partner sales forecast is described above with reference to Table 2. Other exemplary considerations and analysis that facilitate development of a custom marketing plan 280 in accordance with exemplary embodiments of the present invention will now be described in more detail with reference to FIG. 8 and Tables 9-2.

According to an exemplary embodiment of the present invention, more effective marketing services, performed with higher frequency and/or through more channels, are contemplated by establishing a custom marketing plan (CMP) for an MSA. Marketing services performed by a partner under the CMP may likely be more valuable and/or effective considering that it is customized for that market. Consequently, in some embodiments, the fee paid to partners performing under a CMP can also be higher to reflect the higher value of services. Some exemplary marketing activities that may be implemented under an MSA that includes a CMP, as compared to a generic MSA, include, but are not limited to: customer-facing activities, such as a web-based marketing campaign, more frequent direct and/or regularly scheduled mailing campaigns, more frequent and/or regularly scheduled email campaigns, more frequent and/or regularly scheduled customer events, and/or free-standing computer displays of lender advertisements;

and sales agent-facing activities, such as more frequent direct and/or regularly scheduled presentations by the lender at sales meetings, more frequent and/or regularly scheduled training sessions on advantages of using the lender, more frequent and/or regularly scheduled postings of fliers directed at company employees and sales agents, and/or sales agent contests to encourage end customer usage of lender product.

A more detailed listing of exemplary marketing activities contemplated by a CMP is set forth below. Any one, subset or all of the listed activities may be selected and performed when specifying a CMP, as contemplated by exemplary embodiments of the present invention:

---

Customer-facing marketing activities:

1. Encourage all sales agents to display prominent lender signage outside homes for sale listed by agents. The signage shall include messages such as: "Home Loans Available through Lender, [Company's] Preferred Lender".
2. Encourage all sales agents to display prominent lender signage inside homes listed by agents, on "open house" day. The inside signage shall include a "Preferred Lender" flyer stand and slick where Lender can place marketing collateral.
3. Display prominent lender signage inside and/or outside all offices of the company in which customer interaction takes place.
4. Display advertising on the company web site (such as banners, text, and graphics with hypertext links from the web site for click-through access to lender.com), and prominent display of a lender telephone number as provided by lender.
5. Conduct direct mailing campaign marketing lender as a preferred lender to company's prospect database or on company's customer marketing lists (e.g., those who have signed open house sign-in sheets).
6. Conduct e-mail campaign promoting lender to company's prospect database or on company's customer prospect marketing lists. The email campaigns may include a hypertext link to lender.com and a display of a lender telephone number as provided by lender.
7. Include the lender logo, tag line, telephone number(s) and the "Preferred Lender" designation, in all newspaper, radio and/or billboard campaigns conducted in accordance with a media advertising plan,
8. Arrange for lender sales professionals to participate in special events involving company's customers (such as seminars for customers, or open house events) at least once a month.
9. Provide a free-standing display device (desktop/laptop computer, TV, projector, etc) that displays marketing materials (commercials, slide presentations, etc to be provided by lender) continuously during business hours at each of the sales offices and design center(s).

| Sales agent-facing marketing activities: |
| --- |
| 1. Arrange for lender representatives to present products to company real estate brokers during sales meeting(s). |
| 2. Arrange for lender to communicate to sales agents in company sales offices or branches, using printed materials or electronic communication. |
| 3. Conduct training session(s) for company representatives (format and content may be developed by company and/or lender) dedicated to presenting the advantages of using lender's products and services. |
| 4. Allow lender to place marketing material display stands and marketing collateral (fliers, brochures) in company's offices to be viewed by real estate broker agents and potential home buyers. |
| 5. Promote the preferred lender status of lender through an intranet, company newsletter or other forms of internal communications highlighting the exclusive nature of the relationship and why it benefits customers to select lender. |
| 6. Conduct marketing promotion(s) and contests amongst company's employee agents to encourage the promotion of lender products and services to customers. |

In any event, as in the case of an MSA that does not include a CMP, the fee paid to partners under an MSA that includes a CMP may be lower than the fair market value of those services, as explained above with reference to FIGS. 5 and 7, for example.

Figure 8:
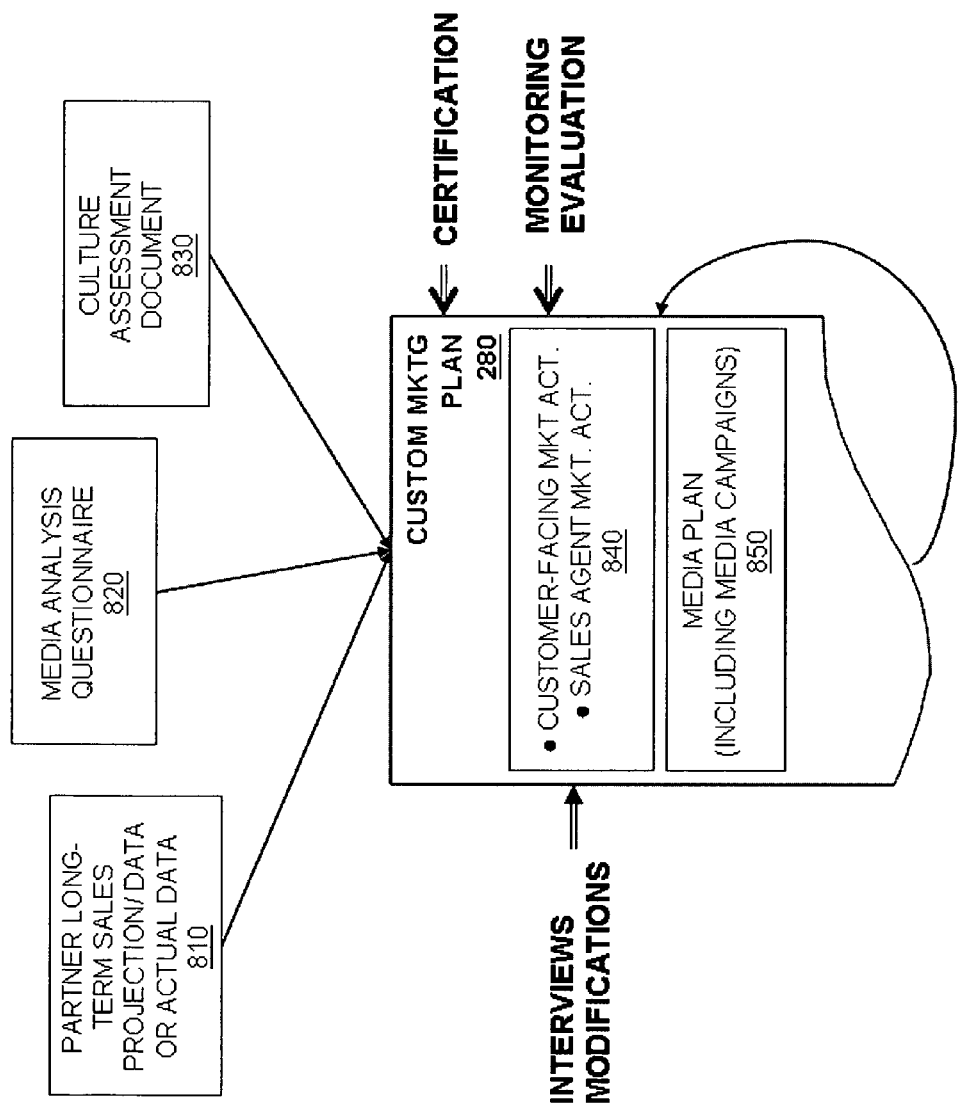
FIG. 8: illustrates exemplary factors that may be considered for developing a custom marketing plan according to an exemplary embodiment of the present invention.

In an exemplary implementation, as shown with reference to FIG. 8 (see also FIGS. 2 and 3), the following processes facilitate establishment of an effective CMP:

Partner completes an MSA questionnaire containing:

Sales projections data 810 (as explained above with reference to FIGS. 2 and 3, and Table 2)

Media analysis questionnaire 820 which is developed into a Media Plan 850, as shown below in Table 9.

Partner's culture assessment questionnaire 830, as shown below in Table 10, is completed and partner's marketing department is interviewed to:

Address any questions related to the partner's current media plan,

Conduct culture analysis of partner organization using the culture assessment questionnaire.

TABLE 9

| Company information | | Target segment | | Product | |
| --- | --- | --- | --- | --- | --- |
| Company name: | Partner's Comany Name | Age | 25-54 | Average Sales Price | $150,000 |
| Contact name: | | Gender | Adults | Foot | |
| Title: | | HH Income | $100.000+ | Product Type | Single family |
| Contact | | Education | Some college | | |
| | | Children in Household | 2+ | | |
| | Station | Air dates (last 3 months) | Dayparts | Weekly TRPs | Total TRPs |
| Broadcast (i.e. tv, cable, radio) | Charter and Comcast Cable TV | | | | |
| | | Weekly # of Spots | Co-branding activities to be performed by Company for Lender | | |
| Broadcast (i.e. tv, cable, radio) | | | Run the Lender TV spot with "[Lender] is the preferred lender of [partner]" | | |
| | Market | Collateral Pieces | Size | # of Stock | Color or B/W |
| Collateral (i.e. brochures, newsletters, posters, flyers) | Grand Rapids and Northern Michigan | Property Flyers | 8½ × 11 | | Color |
| | Grand Rapids and Northern Michigan | Buyer Presentation | 8½ × 11 | | Color |
| | Grand Rapids and Northern Michigan | Posters | 20 × 30" (24 × 36 were considered too large in past) | | Color |
| | | # Produced | Co-branding activities to be performed by Company for Lender | | |
| | Collateral (i.e. brochures, newsletters, posters, flyers) | | Insert lender's logo and phrase "[Lender] is the preferred lender of [partner]" in 10 pt font or larger on the first page of the flyer | | |
| | | | Add a page promoting lender is the preferred lender in presentation | | |

TABLE 9-continued

Insert lender's logo and phrase "[Lender] is the preferred lender of [partner]" in 10 pt font or larger on the first page of the poster

| | Market | Media | Message/Offer | # of offers | Frequency |
|---|---|---|---|---|---|
| Direct Response | G R & N Michigan Grand Rapids and Northern Michigan | E-Card Post card | Sent to 25 closest homes of a "Just Listed" and "Just Sold" property | | |

| | Color or B/W | Co-branding activities to be performed by Company for Lender |
|---|---|---|
| Direct Response | | Create e-card promoting lender to agents Insert lender's logo and phrase "[Lender] is the preferred lender of [partner]" in 10 pt font or larger on the first page of the post card. If Agent opts out create a postcard promoting lender. |

| | Publication | Insertion dates (last 3 months) | Size of ad | Color or B/W | Circulation |
|---|---|---|---|---|---|
| Print (i.e. newspaper, magazine, inserts) | Grand Rapids Press | Sundays | ½ page | B/W | |
| | Charlevoix Courier | Tuesdays | Full Page | 4/C | |
| | Petoskey News-Review | Fridays | ⅓ Page, 4 × 12" | 4/C | |

| | | # of Insertions | Co-branding activities to be performed by Company for Lender |
|---|---|---|---|
| | Print (i.e. newspaper, magazine, inserts) | 46 per year | Insert lender's logo and phrase "[Lender] is the preferred lender of [partner]" in 10 pt font or larger on the ad |
| | | 46 per year | Insert lender's logo and phrase "[Lender] is the preferred lender of [partner]" in 10 pt font or larger on the ad |
| | | 50 per year | Insert lender's logo and phrase "[Lender] is the preferred lender of [partner]" in 10 pt font or larger on the ad |

TABLE 10

CUSTOM MARKETING PLAN
Realtor Media/Cultural Assessment

1) Instructions:
   Please complete the form either on screen (return the saved file by email) or on a printed copy (return by fax/hard copy). If choosing the electronic version, you can navigate between fields using the Tab button on your keyboard.
2) Media/Marketing Plan
   a) Please explain your media strategy? (i.e., increase awareness and foot traffic among prospective customers by delivering advertising messaging thru high impact, localized media channels)
   b) Take us through you media objectives? (i.e., reach our target audience three times per week via Spot Radio)
   c) What is your target audience? (i.e. are you targeting renters? Condo owners? People looking for a second home for an investment? New owners? People from a particular region? )
3) Sales Organization
   d) Number of people in your sales force
   e) Describe your sales force and their interaction with a preferred lender
   f) Are the sales agents in-house employees? Independent contractors? Employees of a third-party marketing agency?
4) Sales Culture: In your opinion, what are your company's characteristics in regards to the following questions?
   a) What does "client first" mean to your company?
   b) As a company are you open to new ways of doing things? Can you give some illustrative examples?
   c) When faced with problems or issues, how do you work together with your business partners to develop solutions in the best interest of both parties?
5) Past Preferred Lender.
   a) Please provide a brief overview of previous preferred tender relationships:
   b) Explain the successes you experienced, providing specific program details:
   c) What challenges did you incur with this lender?
   d) How did you promote your previous lender?
6) Sales Office/Sales center
   a) How many sales offices do you have?
   b) Describe the physical layout of your sales offices and what opportunities are available within the sales center to promote Lender? Does the office get a lot of foot traffic? What physical advertisements are currently present, either for the company or other vendors? (e.g. display stands, banners, monitor/displays, etc)

TABLE 10-continued

CUSTOM MARKETING PLAN
Realtor Media/Cultural Assessment c) Is there a waiting area?
    d) Describe the typical touch points with the buyer through the sales process, from the initial contact to signing of escrow. What are the opportunities for promoting Lender?
7) Event Opportunities
    a) What events do you use to promote your company and your homes for sale? (e.g. local community events, sponsoring non-profit organizations, etc).
    b) What are the opportunities to include Lender in sales event materials?

Media analysis 820 and culture assessment 830 can be used to develop a first draft of the CMP 280 comprising: 6-12 mo Media Plan 850; and customer-facing marketing activities that may include lender, as well as sales-agent facing activities at which lender can be represented 840. One of ordinary skill in the art would readily appreciate that a culture assessment is intended to provide additional information, both objective and subjective that is further indicative and may be used to assess, for example, partner's marketing capabilities and performance goals. The draft CMP is evaluated and refined as needed (as shown in FIG. 8), and then shared with the partner.

According to an exemplary implementation, the CMP may also be reviewed quarterly or in other periodic basis by the lender. Also, for example, on a semi-annual basis, as a precursor to the semi-annual evaluation of the marketing fee, the CMP can be reviewed and revised as necessary.

As noted above with reference to FIG. 1, according to an exemplary embodiment of the present invention, an ongoing evaluation 124 of both MSA in terms of marketing fee paid to a partner and parameters of the CMP (FIG. 1) may be performed. For example, the CMP can be reviewed and revised quarterly, as a precursor to a semi-annual evaluation of the marketing fee. An example of a component of the CMP that may need frequent evaluation and revision (if necessary based on the evaluation) is the Media Plan component.

Figure 9:
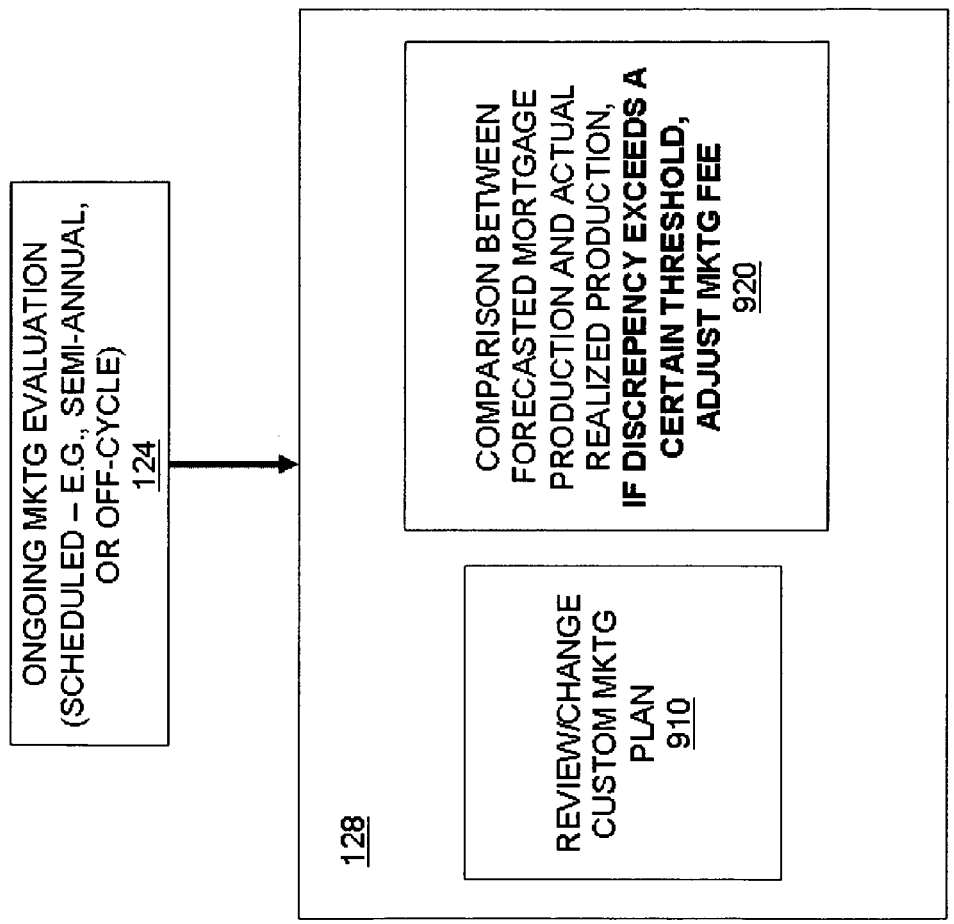
FIG. 9: illustrates, in more detail, evaluation processing of a marketing services agreement according to an exemplary embodiment of the present invention.

For example, custom marketing plan 280 and/or current partner marketing fee may be revised based on the effectiveness of the marketing services performed in the past period. Referring to FIGS. 1, 2 and 9, MSA 290 provides for a fee evaluation, for example, every six months following the end of the Initial Term of the MSA during the remainder of the term of the MSA. This evaluation includes: an evaluation of the frequency, quality, and effectiveness of the marketing services performed; a review of the changes in the Custom Marketing Plan 910; a review of changes in the partner's business plan; a comparison between the forecasted mortgage production and the actual realized production under the MSA 920; and a review of the anticipated quality or success of the marketing campaign of the business partner versus the actual quality and success of the marketing campaign undertaken by the business partner pursuant to the MSA. If a sufficiently large discrepancy between the forecasted mortgage production and the actual realized production is observed, the assumptions may be adjusted. That is, the current marketing fee may be revised as needed by taking into consideration FMV BPS in the FMV BPS table.

The determination of whether a discrepancy is sufficiently large can be based on certain conditions, for example, the percentage of difference between projected versus actual total sales, increase in the lender's brand-awareness in the local area, increase in consumer traffic in the local lender's branches, and loan application growth. Likewise, the determination can be made based on factors specific to the CMP, such as success/failure of certain marketing media, and/or factors specific to partner marketing fee (BPS), such as total number of sales generated as a result of the leads, so that specific adjustments can be made to the CMP and/or partner marketing fee accordingly.

In an exemplary implementation of an evaluation methodology 124, first the accuracy of the sales forecast is verified by looking at the average home price and LTV for all properties sold by the partner, comparing these values to the pool of loans originated under the MSA, and making the necessary adjustments. Second, the cumulative effect of cash sales, application rate, and conversion rate are evaluated by comparing the number of units forecasted at the beginning of the term to the actual number of loans originated under the MSA, and the necessary adjustments are made.

According to an exemplary embodiment of the present invention, the evaluation 124 can take place on a regular schedule, for example on a semi-annual cycle, but can also take place off-cycle. For example, an off-cycle fee adjustment for Builder MSAs, on an exception basis, can take place in circumstances such as:

The builder is not meeting its initial delivery schedule for new units, as initially captured in Company Data (see Table 2 above).
    A delay in obtaining permits or approvals, etc., which, in turn, prevent or substantially delay construction completion.
    Local market demand has materially changed since the most recent Company Data have been submitted to lender.
    It is discovered that any of the Company Data submitted by the partner is materially incorrect.
    The builder is unable, for any reason, to perform marketing responsibilities as outlined in CMP 280 such that the marketing fee 270 no longer represents reasonable compensation for the services the builder is able to perform.

In some embodiments, at no point are the fee adjustments calculated as, or intended to serve as, a compensation mechanism for marketing results during the prior period being different from the original forecast. That is, in an exemplary implementation, when the partner's marketing fee is revised based on actual production data, new marketing fee is not applied retroactively. Instead, the new marketing fee is generally applied going forward. For example, assuming that the loans/leads that were generated by a partner (MSA builder or real estate broker) during the course of an evaluation period are substantially higher than initially projected, then in the next marketing fee valuation, the partner's marketing fee, based on the partner's BPS, may be increased based on the actual data taking into account a reasonable expectation that the partner may perform at least as well during the next term (for example, next evaluation period). The new marketing fee is applied prospectively, that is, only for the next (future) term and not retroactively for the past production.

Figure 10:
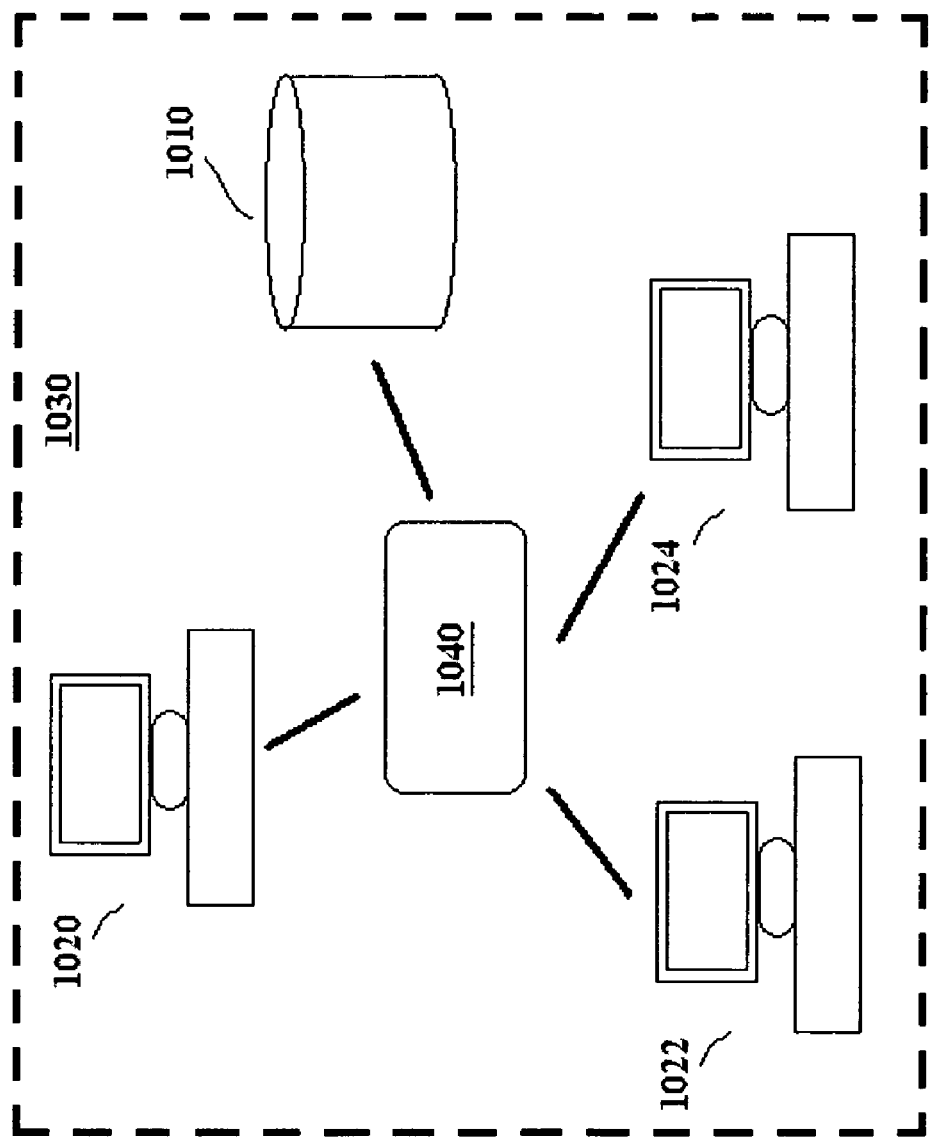
FIG. 10: is a block diagram illustrating an exemplary implementation on a computing medium of processing according to exemplary embodiments of the present invention.

Exemplary embodiments of the present invention can also comprise computer readable codes on a computer readable medium. For example, as shown in FIG. 10, the computer readable medium can comprise any data storage device 1010 that can store data that can be read by a computer system 1020. Examples of a computer readable medium include magnetic storage media (such as, ROM, floppy disks, hard disks, among others), optical recording media (such as, CD-ROMs, or DVDs), and storage mechanisms such as carrier waves (such as, transmission through the Internet). Data storage device 1010 can be implemented as part of the stand-alone computer system, and can have stored thereon inter alia database for baseline fair market value of marketing services, processing required to search such a database using various search criteria, and some or all of the processing as described above with reference to FIGS. 1-9. Likewise, the computer readable medium can also be distributed over network 1030 comprising coupled computer systems 1020, 1022, 1024, . . . , so that the computer readable code is stored and executed in a distributed fashion, and the data can be accessed over, for example the Internet 1040, from a plurality of locations. Also, functional programs, codes, and code segments for accomplishing exemplary embodiments of the present invention can be construed by programmers of ordinary skill in the art to which the present invention pertains.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

We claim:

1. A method for determining payment for a service, the method comprising:
developing at least one service criterion for a service to be provided;
determining at least one geographical area where the service is to be provided, the determining of the at least one geographical area comprising identifying at least one of a geographical marketing area (GMA), a core-based statistical area (CBSA) and a ZIP code;
evaluating at least one characteristic of a service provider providing the service;
determining by a microprocessor a fee for the service to be provided, the fee determined based on data stored on non-transient computer-readable medium, the data indicative of the service criterion, the geographical area and the characteristic of the service provider;
comparing by a microprocessor the determined fee with a reference baseline fee; and
setting by the microprocessor a numerical value indicative of a payment amount to the service provider for providing the service based on the comparing,
wherein:
the service to be provided comprises a marketing service;
the developing of the at least one service criterion comprises determination of at least one marketing-related objective;
the reference baseline fee comprises a fair market value of marketing service determined with reference to at least one geographical area where the service is to be provided,
the method further comprising:
identifying the geographical area where the marketing service is performed;
defining an objective of the marketing service;
determining cost of performing the marketing service in the geographical area in order to meet the objective; and
defining a baseline fair market value (FMV) of the marketing service for the geographical area with reference to the cost of performing the marketing service, and
wherein:
the marketing service comprises marketing of a lender, and the defining of the objective of the marketing service comprises defining a number of loans to be generated by the lender in the geographical area as a result of the marketing service; and
the determining of the cost of performing the marketing service in the geographical area comprises estimating a number of leads needed to be generated by the marketing service in order to generate the number of the loans in the geographical area as a result of the marketing service, wherein the estimating comprises using an equation:

$$\text{Leads needed} = \frac{\text{Number of Loans}}{(\text{lead-to-application rate}) \cdot (\text{application-to-funding rate})}$$

where the lead-to-application conversion and application-to-funding rate are assumed percentage values determined by evaluating past performance of the marketing service.

2. The method of claim 1, wherein data indicative of the reference baseline fee is maintained on a non-transient computer-readable medium, and the comparing of the determined fee with the reference baseline fee comprises accessing the non-transient computer-readable medium.

3. The method of claim 1, wherein the determination of the at least one marketing-related objective comprises evaluation of marketing media in the geographic area.

4. The method of claim 3, wherein the marketing media comprises at least one of television, radio, Internet, newspapers, magazines and periodicals.

5. The method of claim 1, further comprising creating a service agreement, the service agreement comprising the payment amount and a plan outlining the service to be performed.

6. The method of claim 5 further comprising:
evaluating a plurality of characteristics of the service provider providing the service; and
developing a customized plan for providing the service to be performed based on the evaluation of the characteristics of the service provider with reference to the geographical area and the at least one service criterion.

7. The method of claim 6, wherein data indicative of at least one of the service criterion, the geographical area and the characteristics of a service provider is maintained on a non-transient computer-readable medium, and the developing of the customized plan comprises accessing the non-transient computer-readable medium.

8. The method of claim 6 further comprising:
determining a fee for the service to be provided based on the developed customized plan for providing the service;
comparing the determined fee with a reference baseline fee; and
setting a payment amount to the service provider for providing the service within the customized plan based on the comparing.

9. The method of claim 6, wherein:
the service to be provided comprises a marketing service; and
the developing of the customized plan comprises developing a custom marketing plan for the service provider.

10. The method of claim 9, wherein the characteristics of the service provider comprise information obtained based on at least one of:
an organizational assessment of the service provider;
a cultural assessment of the service provider;
a media campaign assessment of the service provider;
assessment of an actual production of the service provider with the service criterion; and
assessment of a forecasted production of the service provider within the service criterion.

11. The method of claim 6, wherein the at least one service criterion comprises a service-related objective, the method further comprising re-evaluating at least the customized plan, wherein the re-evaluating comprises:
assessing past production of the service provider with reference to the service-related objective when providing the service within the customized plan prior to the re-evaluating;
re-assessing at least one of the characteristics of the service provider based on the assessed past production of the service provider;
determining if any modifications to the customized plan are required based on the re-assessing of the at least one of the characteristics; and
if at least one of the modifications is required, preparing a modified customized plan with reference to at least one of the modifications.

12. The method of claim 11, further comprising:
re-calculating the fee for the service to be provided in the future based on the modified customized plan;
comparing the re-calculated fee with the baseline fee.

13. The method of claim 12, wherein a frequency of performing the re-evaluating comprises at least one of scheduled performance of the re-evaluating and on-demand performance of the re-evaluating.

14. The method of claim 1, wherein the evaluating of the service provider comprised evaluating information indicative of at least one of: actual production of the service provider based on the at least one service criterion; and forecasted production of the service provider based on the at least one service criterion.

15. The method of claim 1, the at least one service criterion comprises a service-related objective, the method further comprising re-evaluating at least the payment amount to the service provider, wherein the re-evaluating comprises:
assessing past production of the service provider with reference to the service-related objective when providing the service prior to the re-evaluating;
re-calculating the fee for the service to be provide in the future based on at least one of the assessing of the past production of the service provider, the service criterion, and the geographical area;
comparing the re-calculated fee with the reference baseline fee; and
setting a payment amount to the service provider for providing the service based on the comparing of the re-calculated fee with the reference baseline fee.

16. The method of claim 15, wherein a frequency of performing the re-evaluating comprises at least one of scheduled performance of the re-evaluating and on-demand performance of the re-evaluating.

17. The method of claim 1, wherein, if the service is to be provided in a plurality of geographical areas, then the reference baseline fee is determined with reference to respective baseline fees in each of the plurality of the geographical areas.

18. The method of claim 17, wherein the determination of the reference baseline fee comprises calculating a weighted average of the respective baseline fees.

19. The method of claim 1, wherein the marketing service comprises marketing of a lender, and at least one marketing-related objective comprises a number of loans secured by the lender.

20. The method of claim 1, wherein data indicative of at least one of the geographical area, the objective, and the cost is maintained on a non-transient computer-readable medium, and the defining of the baseline FMV comprises accessing the non-transient computer-readable medium.

21. The method of claim 1, wherein the identifying of the geographical area comprises identifying at least one of a geographical marketing area (GMA), a core-based statistical area (CBSA) and a ZIP code.

22. The method of claim 1 further comprising defining an average loan balance of the loans in the geographical area.

23. A method for determining payment for a service, the method comprising:
developing at least one service criterion for a service to be provided;
determining at least one geographical area where the service is to be provided, the determining of the at least one geographical area comprising identifying at least one of a geographical marketing area (GMA), a core-based statistical area (CBSA) and a ZIP code;
evaluating at least one characteristic of a service provider providing the service;
determining by a microprocessor a fee for the service to be provided, the fee determined based on data stored on non-transient computer-readable medium, the data indicative of the service criterion, the geographical area and the characteristic of the service provider;
comparing by a microprocessor the determined fee with a reference baseline fee; and
setting by the microprocessor a numerical value indicative of a payment amount to the service provider for providing the service based on the comparing,
wherein:
the service to be provided comprises a marketing service;
the developing of the at least one service criterion comprises determination of at least one marketing-related objective;
the reference baseline fee comprises a fair market value of marketing service determined with reference to at least one geographical area where the service is to be provided,
the method further comprising:
identifying the geographical area where the marketing service is performed;
defining an objective of the marketing service;
determining cost of performing the marketing service in the geographical area in order to meet the objective;
defining a baseline fair market value (FMV) of the marketing service for the geographical area with reference to the cost of performing the marketing service; and
defining an average loan balance of the loans in the geographical area, and wherein:

the marketing service comprises marketing of a lender, and the defining of the objective of the marketing service comprises defining a number of loans to be generated by the lender in the geographical area as a result of the marketing service; and the defining of the baseline FMV of the marketing service for the geographical area comprises using an equation:

$$FMV = B/(C \cdot D)$$

where the FMV is the baseline FMV of the marketing service for the geographical area expressed in terms of basis points (BPS), the B is the cost of performing the marketing service, (C) is the number of loans to be generated by the lender in the geographical area as the result of the marketing service, and (D) is the average loan balance for the geographic area.

* * * * *